Patented June 6, 1944

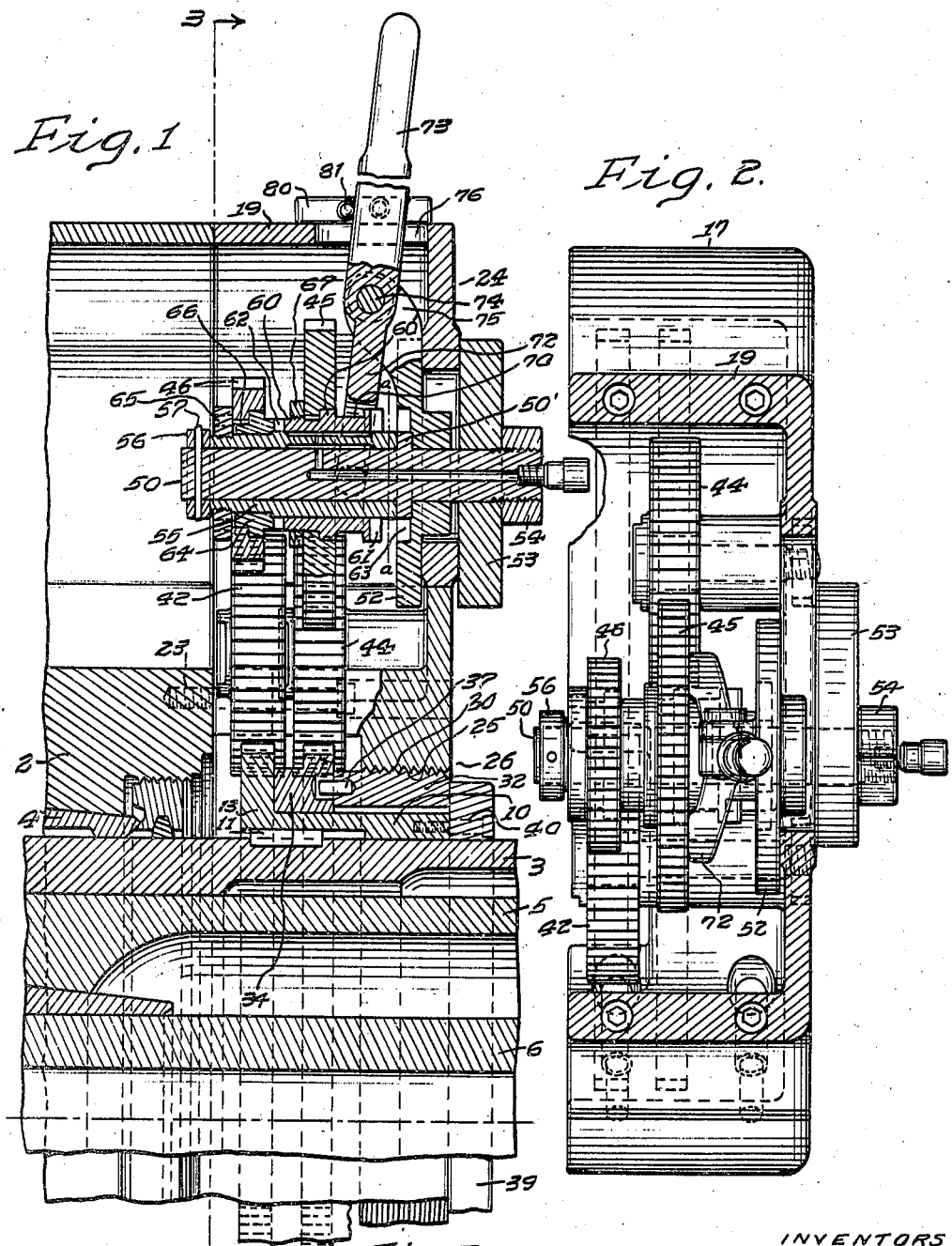

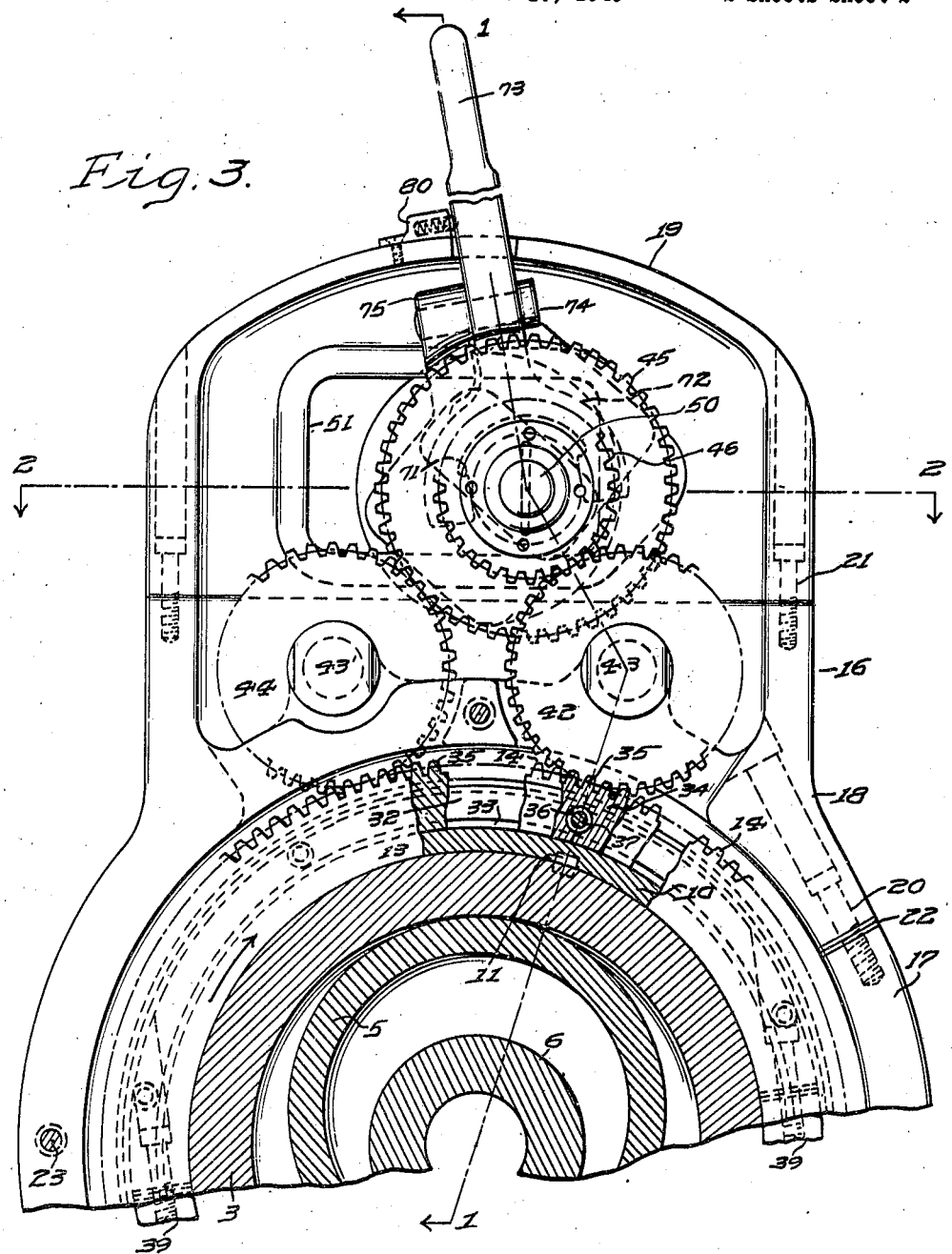

2,350,406

UNITED STATES PATENT OFFICE 2,350,406

MILLING MACHINE

Henry J. Leisner, Philadelphia, and Harry C. Sheaffer, North Hills, Pa., assignors to The Hall Planetary Company, Philadelphia, Pa., a corporation of Pennsylvania Application June 18, 1943, Serial No. 491,300

4 Claims. (Cl. 10—154)

This invention relates to milling machines of the general type disclosed in the following United States Letters Patent: 1,316,718, September 23, 1919; 1,507,235, September 2, 1924; 1,899,865, February 28, 1933; 2,008,757, July 23, 1935; 2,081,275, May 25, 1937; 2,177,319, October 24, 1939; and 2,266,338, December 16, 1941, and is particularly directed to the provision of means for imparting axial movement to the cutter or for restraining it therefrom in accordance with the character of the work to be performed upon the machine.

Machines of the type generally exemplified in the aforementioned patents, marketed under the trade mark "Planetary," are capable of performing a very wide range of milling operations which, however, fall into two general categories, namely, thread milling and form milling, and as the cutters employed for thread milling have teeth conforming to the profile of the desired thread but without pitch, it is essential that they be advanced axially while operating on the work to produce therein a continuous thread, the pitch or lead of which is of course determined by the rate of axial progression of the cutter. On the other hand, when the machines are used for form milling it is essential the cutter be restrained from axial movement so it will travel about the work in a single plane normal to the axis of the latter.

These machines are of the "production" type, that is, primarily intended for machining a large number of similar pieces after they are once set up for the purpose and, during their operating cycle, the rotating cutter is first moved to depth in the work, next slightly in excess of 360° around a circular orbit concentric with the surface to be produced thereon, then out of engagement with the work along substantially the same path which was followed in moving the cutter thereinto, and finally around a circular orbit but in the opposite direction to return the cutter and associated mechanism to starting position; as hitherto stated, when cutting threads the cutter is also progressively moved axially during its initial or operating orbital movement and during the corresponding return.

These several movements of the cutter, save that of its rotation on its own axis, are effected through coordinated operation of a cylindrical outer or main container within which is eccentrically disposed a cylindrical inner or secondary container in which the cutter spindle is, in turn, also eccentrically journaled. To bring the rotating cutter to depth in the work, which is held in fixed relation to the bed of the machine by a suitable chuck or fixture the character of which is determined by the configuration of the workpiece, the secondary container is first turned in the main container for a predetermined distance so as to carry the cutter in an arcuate path toward and finally into the work until the desired depth of cut therein is attained; the main container then is set in motion and the two containers revolved as a unit until the cutter has completed its orbital movement and thus finished the cut. Movement of the main container is then arrested and the secondary container turned relatively thereto in reverse direction so as to withdraw the cutter from the work and after the cutter is cleared therefrom both containers are revolved as a unit in reverse direction until they attain their initial position, thus completing the cycle of the machine.

As will be apparent from some of the aforesaid patents, originally the requisite axial progression of the cutter when milling threads was effected by cooperation of a master thread carried by the main container and a master nut stationarily supported from the frame of the machine, with the result that when the main container rotated both containers as well as the cutter spindle and cutter were moved axially while the cutter engaged the work at a rate and in a direction determined by the pitch and "hand" of the master thread and nut. In consequence the thread produced on the work by the "no pitch" cutter corresponded in pitch and hand to that of the master thread and nut, so that if it were desired, for example, to mill a right hand thread having 10 turns to the inch, a master thread and nut of similar pitch and hand were required. It resulted that to adapt the machine for cutting right and left hand threads of different pitches, a series of master threads and nuts had to be kept available and as they are relatively expensive, the maintenance of several sets for each machine entailed a material nonproductive investment, while the time and labor required for removing one set from and substituting another in the machine was also considerable.

Hence later machines have been so designed that but a single master thread and nut may be utilized for milling either right or left hand threads of various pitches, rotation of the main container being effected through a gear train interposed between it and the main driving gear and so arranged that the ratio of the train may be readily varied by the substitution of different gears therein whereby the axial progression of the cutter induced by cooperation of the master gear and nut may be increased or diminished for each revolution of the container with consequent production in the work of a thread of predetermined pitch either greater than, equal to or less than that of the master thread and nut. Moreover, the construction is such that by the introduction of an additional pinion into the train the direction of rotation of the container may be changed at will to enable the production of a left hand thread with a master thread and nut of right hand pitch and vice versa.

However when the machine is used for form milling no movement of progression is imparted to the main container but only a movement of rotation, and the principal object of the present invention, therefore, is the provision of means whereby machines of the later type to which we have referred may be conditioned for thread milling or for form milling with a maximum of convenience and rapidity.

Other objects, advantages and novel features of design, construction and arrangement comprehended by the invention are hereinafter more particularly described or will be apparent to those skilled in the art from the following description of one embodiment thereof as illustrated in the accompanying drawings, in which:

Fig. 1 is a fragmentary vertical section substantially on line 1—1 in Fig. 3;

Fig. 2 is a fragmentary horizontal section on line 2—2 in Fig. 3;

Fig. 3 is a vertical section on line 3—3 in Fig. 1; and

Figs. 4 and 5 are fragmentary detail views in vertical section looking in opposite directions on line a—a in Fig. 1.

Throughout the drawings the same characters of reference are employed to designate the same parts, and only so much of those parts of the machine not directly affected by or concerned with the present invention are shown as is requisite for its ready comprehension.

In its commercial embodiment the milling machine for operative combination and association with which the present invention is primarily intended comprises, among other things, a unitary frame provided with cylindrical horizontally aligned longitudinally spaced container housings 2 (only one of which is fragmentarily shown) through which extends a hollow cylindrical main container 3 journaled on suitable bearings 4 in the housing. A secondary container 5 is eccentrically mounted for limited rotation within the main container and within and eccentrically journaled in the secondary container is a longitudinally extending cutter spindle 6 which at its forward end beyond the adjacent housing and containers supports the cutter and at its rear end, also extending beyond the containers, is supplied with driving mechanism (not shown) whereby it may be driven independently of the containers to effect axial rotation of the cutter.

Means (not shown) are also provided for imparting to the secondary container limited rotative movement within the main container for the purpose of moving the cutter to depth in the work and for subsequently rotating it in reverse direction to clear it therefrom upon completion of the cutting operation, as well as means for rotating the main and secondary containers as a unit after the cutter has been moved to depth so as to carry it in an orbital path around the work for slightly more than a single revolution and enable it to perform its duty thereon while it is rotating on its own axis under the influence of its independent driving means and finally, following completion of the cut and withdrawal of the cutter from the work, for rotating the main and secondary containers as a unit in the opposite direction to return the parts to initial position.

As hitherto explained, since the cutter is itself without pitch, it is necessary in order to produce a continuous thread on the work to impart to the cutter a progressive axial movement while it is operating thereon, the rate at which it is so moved determining the pitch of the thread and the direction of movement determining its "hand." This rate and direction of progression are controlled in the following manner.

At a suitable point between the housings in which it is journaled the main container is surrounded by a band 10 constrained to turn with the container by a key 11. At one end, for convenience termed the "inner" end, the band is provided with a radial flange 13 having gear teeth 14 on its periphery.

In part surrounding and in part extending radially from the main container is a gear housing, generally designated 16, which is desirably made in three sections, namely, a lower generally semi-annular section 17 which extends substantially half way around the container, an intermediate section 18 having a portion complemental to the lower section extending substantially around the other half of the container and also a radially extending portion, and an upper section or cap 19 seating thereon, the lower section being attached to the corresponding part of the intermediate section by countersunk bolts 20 and the cap to its radially extending portion by other countersunk bolts 21, shims 22 being preferably disposed between the lower and intermediate sections to facilitate compensation for wear. The intermediate section is so formed as to in part abut the end of the adjacent container housing 2 and is secured to the latter by countersunk bolts 23, and the lower section 17 may also be similarly bolted thereto so that both sections are rigidly supported thereon; to facilitate adjustment a suitable clearance may be provided about the bolts.

The cap 19 and upper part of the intermediate section 18 of housing 16 are hollow and the outer end wall of the cap, designated as 24, is sufficiently heavy to form a support for certain elements hereinafter described; adjacent the main container the corresponding wall of section 18 is suitably thickened and provided with an internal thread 25 while the lower section 17 is also similarly internally threaded so that when the parts are assembled a continuous thread extends about and in radially spaced relation to the main container to form the "master nut" designated generally as 26.

This internal thread is cooperative with an external master thread 30 on a master ring 32 disposed within thread 25 and surrounding the outer end of band 10, the internal diameter of the ring being somewhat greater than the outer diameter of the band so there is an appreciable clearance 33 between these parts.

Between the inner end of ring 32 and the outer face of flange 13 is a driving ring 34 which seats snugly but rotatably on the band and has a radial flange with gear teeth 35 on its periphery; the pitch diameter of these teeth being preferably equal to that of teeth 14. This ring has a circumferentially spaced series of holes 36 in its outer face into which extend driving pins 37 fixed in ring 32 but of less diameter than the holes so that an appreciable clearance is provided between the walls of the holes and the pins, while to hold the parts just described in assembled relation and prevent endwise movement of band 10 on the container, a split clamp collar 39 is seated against the outer faces of ring 32 and band 10 and secured to the latter by countersunk bolts 40. It will thus be apparent that when ring 34 is turned on band 10 it will cause a similar turning movement of master ring 32 through the driving connection effected between these rings by pins 37, and reference will now be made to the means through which this turning is brought about when required.

In the intermediate section 18 of housing 16 a gear 42 in constant mesh with teeth 14 on band 10 is suitably mounted on a shaft 43 and a generally similar gear 44 is correspondingly arranged on a shaft 43' in the same portion of the housing to constantly mesh with teeth 35 on ring 34, these gears being preferably of the same size. Interposed between them are two pinions 45, 46 which are primarily supported from a stud shaft 50 adjustably secured to the housing cap wall 24 in the manner now to be described to permit the substitution of pinions of different sizes to vary the ratio of the drive and thus the relative rate of revolution of master ring 32 and main container 3.

To this end shaft 50 is extended through an opening 51, conveniently of generally rectangular shape, in the wall of the housing and provided with a radial flange 50' which abuts a plate 52 disposed against the inner face of said wall and surrounding the shaft, this plate being preferably thickened proximate the latter so as to extend into the opening and increase its bearing area on the shaft. On the outside of the housing a heavy washer 53 is disposed and the extremity of the shaft is threaded and provided with a nut 54, the washer and plate being of sufficient size to overlie all or a suitable portion of the rim of the opening in any position of the shaft therein, so that by setting up on the nut the shaft may be clamped in place after it has been moved about in the opening to properly mesh the pinions with the gears.

In accordance with our invention means are provided for throwing pinion 45 into and out of mesh with gear 44 so as to establish the drive through the train and thus condition the machine for thread milling or to interrupt that drive and thus condition it for form milling, said means moreover being of a character to facilitate substitution with maximum convenience of pinions of different diameters as aforesaid whereby to vary the ratio of the drive.

To this end a bushing 55 is rotatably mounted on the shaft between flange 50' and a collar 56 detachably secured, as by a taper pin 57, at the other end of the shaft and on this bushing is slidably mounted a clutch sleeve 60 having clutch teeth 61, 62 at its opposite ends.

The teeth 61 are adapted to mesh in depressions 63 in the inner face of plate 52 when the sleeve is slid on the bushing for a sufficient distance to the right from the position shown in Fig. 1, thereby locking the sleeve to the plate and preventing it from turning relatively to the bushing; in like manner teeth 62 at the inner end of the sleeve are adapted to mesh in depressions in the forward face of a pinion collar 64 seating on the bushing which is preferably reduced in diameter at this point to form a shoulder limiting movement of the collar. This collar is adapted to removably support pinion 46 and to this end may be provided with a peripheral flange receivable in a corresponding recess in the forward face of the pinion which is held in position by a nut 65 threaded onto the end of the bushing while a key 66 prevents the pinion from turning on the collar. Thus when the sleeve is in the position of Fig. 1 it is locked to the collar and the pinion, collar and clutch sleeve therefore rotate as a unit.

In a generally similar manner pinion 45 is removably supported on the clutch sleeve being held by a nut 67 against a radial flange 60' thereon seating in a recess in its front face, a key preventing rotation of the pinion on the sleeve. The later is provided between this flange and teeth 61 with a peripheral groove 70 in which are received oppositely inwardly directed bosses 71 on a fork 72 forming the lower end of a lever 73 pivoted on a stud 74 carried by an extension 75 of plate 52, the lever passing outwardly through a slot 76 in the housing cap.

Thus by shifting the lever from the position of Fig. 1, to the opposite extremity of its travel so that teeth 61 are meshed with the depressions in plate 52, the sleeve may be locked to the latter and hence against rotation, and to releasably maintain the lever in either of its two limit positions a plate 80 carrying spring pressed balls 81 may be mounted on the housing cap, the lever being provided with a depression for registry with either of them.

It will now be apparent that when the parts are in the position shown in the drawings and the main container is turned in the direction of the arrow in Fig. 3, master ring 32 will turn in a similar direction in fixed master nut 26 and by cooperation therewith will cause the container, band 10, drive ring 34, master ring 32 and collar 39 to move axially relatively to housings 2 and 16, thereby correspondingly moving the cutter and cutter spindle 6 axially of the work at a rate determined by the relative rates of revolution of drive ring 34 and master ring 32 which, in turn, is determined by the composition of the gear train interposed between these rings. Using a "no-pitch" cutter, a thread therefore will be formed in the work having a pitch corresponding to the axial progression of the container per unit of revolution and the pitch may therefore be greater than, equal to or less than that of the master thread and nut. For example, when the ratio of pinions 45, 46 is 1:1, the pitch of the thread produced will be the same as that of the master thread, but when their ratio is as 5:3, as shown, its pitch will be greater than that of the master thread, and should their ratio be as 3:5 it will be correspondingly less. Also by introducing another pinion into the train, suitably supported on a shaft removably secured to the housing, the direction of axial progression of the container may be readily reversed to enable the cutting of threads of a pitch opposite to that of the master thread but this feature forms no part of the present invention.

Whenever it is desired to utilize the machine for form milling, as distinguished from thread milling, it is therefore only necessary to shift lever 73 to the position opposite that shown in Fig. 1 so as to lock teeth 61 in the depressions of plate 52 and disengage teeth 62 from collar 64. Pinion 46 then merely idles when gear 42 revolves but no motion is communicated to pinion 45 which, together with gear 44, drives ring 34 and master ring 32 remains stationary although main container 3 and its attached band 10 and gear 42 are free to turn. The container can therefore revolve when and as required to carry the tool around the work during the cutting portion of the cycle and to return it to initial position after the cut is completed and the tool retracted from the work in the performance of form milling. Consequently a machine constructed in accordance with our invention can be conditioned for thread milling or for form milling and vice versa when desired by merely shifting lever 73 from one limit position to the other.

It will further be apparent that it is a very simple matter to substitute other pinions of different sizes for pinions 45, 46, it being only necessary to take off collar 56 and nuts 65, 67 to enable the pinions to be removed from their operative positions preparatory to replacing them with others, nut 54 being of course loosened and shaft 50 moved about in the opening to bring the new pinions into proper mesh with gears 42, 44 before again locking the shaft in place.

While we have herein described and illustrated with considerable particularity a form of our invention which we now deem preferable, we do not thereby desire or intend to limit ourselves specifically thereto or to any precise details of construction and arrangement of the instrumentalities employed as the same are capable of modification in numerous particulars without departing from the spirit and scope of the invention as defined in the appended claims.

Having thus described our invention, we claim and desire to protect by Letters Patent of the United States:

1. In a machine of the class described, a rotatable main container, means for rotating the container, a fixed nut surrounding the container, a threaded ring cooperative with the nut, a gear rotatable with the container, a second gear rotatable independently thereof, driving means between the second gear and the ring, a gear train interposed between said gears including a pair of pinions, a shaft adjustable to different positions with respect to the container, means for holding the shaft in adjusted position, a bushing on the shaft removably supporting one of the pinions, a clutch element slidable on the bushing removably supporting the other pinion and movable into and out of driving connection with the first pinion, a lever for shifting the element, and means for supporting the lever in the same relation to the shaft irrespective of the adjusted position of the latter, whereby when said element has driving connection with the first pinion rotation of the container is operative to turn the ring in the nut and thereby cause axial movement of the container and when said element is shifted out of said driving connection by operation of the lever the ring remains stationary in the nut.

2. In a machine of the class described, a rotatable main container, means for rotating the container, a fixed master nut, a threaded ring cooperative therewith, a gear rotatable with the container, a second gear rotatable independently thereof, means adapted to drive the ring from the second gear, a gear train interposed between said gears including a pair of pinions, a shaft forming a primary support for the pinions, a bushing rotatable on the shaft, a clutch collar rotatable thereon removably supporting one of the pinions, a sliding clutch element rotatable on the bushing removably supporting the other pinion, means adapted to support the shaft in fixed position, said element having driving connection with the clutch collar when in one position and locking connection with said shaft supporting means when in another position, and a lever pivoted to said means for shifting the element from one position to the other, whereby when the container is revolved and driving connection is established between the element and the collar axial movement is imparted to the container through cooperation of said threaded ring and nut and when the element is locked to the supporting means the ring remains stationary with respect to the nut and no axial movement is imparted to the container.

3. In a machine of the class described, a rotatable main container, means for rotating the container, a fixed master nut, a threaded ring extending into and cooperating with the nut, a gear rotatable with the container, a second gear rotatable independently thereof, a gear train interposed between said gears including a pair of pinions respectively interchangeable with others of different size to vary the ratio of the train, a shiftable clutch element, a shaft carrying said element and said pinions and adjustable to different positions in conformity with the size of the latter to maintain them respectively in mesh with the gears, said element having driving connection with one of the pinions and movable into and out of like connection with the other pinion, driving means between the second gear and the ring, and means for shifting the clutch element whereby when the latter has driving connection with said other pinion the ring turns in the nut when the container is rotated to thereby cause it to move axially and when the element is disconnected therefrom the ring remains stationary and the container is devoid of axial movement.

4. In a machine of the class described, a rotatable container, a gear rotating therewith, means for rotating the container, a second gear rotatable independently of the container, a gear train interposed between said gears including a pair of pinions interchangeable with others to vary the ratio of the train, a clutch element adapted to connect or disconnect the pinions in accordance with its position, a shaft carrying said element and adjustable to different positions in conformity with the size of the pinions to maintain them respectively in mesh with the gears, means for securing the shaft in adjusted position, and clutch element shifting means movable with the shaft.

HENRY J. LEISNER.
HARRY C. SHEAFFER.